(12) United States Patent
Lopez et al.

(10) Patent No.: US 9,009,839 B2
(45) Date of Patent: Apr. 14, 2015

(54) METHOD AND DEVICE FOR PROTECTING THE INTEGRITY OF DATA TRANSMITTED OVER A NETWORK

(75) Inventors: Juan Lopez, Grenade (FR); Jean-Michel Camus, Saint-Orens de Gameville (FR); Jean-Marc Couveignes, Toulouse (FR); Gilles Zemor, Talence (FR); Marc Perret, Montech (FR)

(73) Assignee: Airbus Operations S.A.S., Toulouse (FR)

( * ) Notice: Subject to any disclaimer, the term of this patent is extended or adjusted under 35 U.S.C. 154(b) by 579 days.

(21) Appl. No.: 13/001,789

(22) PCT Filed: Jun. 5, 2009

(86) PCT No.: PCT/FR2009/000664
§ 371 (c)(1),
(2), (4) Date: Feb. 25, 2011

(87) PCT Pub. No.: WO2010/000965
PCT Pub. Date: Jan. 7, 2010

(65) Prior Publication Data
US 2011/0162081 A1    Jun. 30, 2011

(30) Foreign Application Priority Data
Jul. 2, 2008    (FR) ...................................... 08 54500

(51) Int. Cl.
*H04L 9/32* (2006.01)
*G06F 21/31* (2013.01)
*H04L 12/24* (2006.01)
*H04L 29/06* (2006.01)

(52) U.S. Cl.
CPC .............. *H04L 9/3242* (2013.01); *G06F 21/31* (2013.01); *H04L 41/04* (2013.01); *H04L 41/0806* (2013.01); *H04L 63/0892* (2013.01); *H04L 63/0876* (2013.01)

(58) Field of Classification Search
None
See application file for complete search history.

(56) References Cited

U.S. PATENT DOCUMENTS

| | | | | |
|---|---|---|---|---|
| 6,047,391 | A * | 4/2000 | Younis et al. | 714/47.1 |
| 6,157,635 | A * | 12/2000 | Wang et al. | 370/352 |
| 6,894,994 | B1 | 5/2005 | Grob et al. | |
| 6,925,088 | B1 * | 8/2005 | Moreaux | 370/407 |

(Continued)

FOREIGN PATENT DOCUMENTS

| | | |
|---|---|---|
| EP | 1 881 638 | 1/2008 |
| FR | 2 864 387 | 6/2005 |

OTHER PUBLICATIONS

International Search Report Issued Feb. 22, 2010 in PCT/FR09/000664 filed Jun. 5, 2009.

*Primary Examiner* — Saleh Najjar
*Assistant Examiner* — Jason Plotkin
(74) *Attorney, Agent, or Firm* — Oblon, McClelland, Maier & Neustadt, L.L.P.

(57) ABSTRACT

A method of transmitting data over a network, from a sending application to a receiving application, including: coding the data, by the sending application, by implementing a predefined rule; detecting alteration of at least one item of data transmitted, by the receiving application, by implementing the predefined rule; and in case an alteration of a data item is detected, restoring the altered data item. In the course of the coding, in the course of the alteration detection, and in the course of the restoration, a cyclic redundancy check or an encryption can be implemented.

13 Claims, 4 Drawing Sheets

(56) References Cited

U.S. PATENT DOCUMENTS

| | | | |
|---|---|---|---|
| 7,339,901 B2 | 3/2008 | Saint Etienne et al. | |
| 7,362,755 B2 | 4/2008 | Saint Etienne et al. | |
| 7,643,993 B2* | 1/2010 | Heiman | 704/242 |
| 8,352,809 B2* | 1/2013 | Kabulepa et al. | 714/703 |
| 8,432,849 B2* | 4/2013 | Krishnasawamy et al. | 370/317 |
| 2005/0262351 A1* | 11/2005 | Levy | 713/176 |
| 2006/0171532 A1* | 8/2006 | Iketani et al. | 380/28 |
| 2007/0140259 A1* | 6/2007 | Mouffron et al. | 370/395.32 |
| 2008/0112561 A1 | 5/2008 | Kim et al. | |
| 2008/0205416 A1* | 8/2008 | DeChiara | 370/401 |
| 2009/0003589 A1* | 1/2009 | Mathew et al. | 380/28 |
| 2009/0213848 A1* | 8/2009 | Jeon et al. | 370/389 |
| 2009/0259925 A1* | 10/2009 | Balasubramanian et al. | 714/807 |
| 2010/0131817 A1* | 5/2010 | Kong et al. | 714/749 |

* cited by examiner

METHOD AND DEVICE FOR PROTECTING THE INTEGRITY OF DATA TRANSMITTED OVER A NETWORK

This invention relates to a method and a device for protecting the integrity of data transmitted over a network. It applies, in particular, to communications over a network using the AFDX (Acronym for Avionics Full DupleX) technology in the aeronautical field. It may be applied, however, to all communication networks, particularly those that rely on the IEEE standard 802.3.

The AFDX technology is the new technology of reference in avionic networks. It is used for exchanging data among different airplane computers. It relies on the transfer of messages with switching of Ethernet frames 802.3 via AFDX switches on the network. The terminal equipment items in charge of the transmission or reception of data are organized around the switches in charge of the transport of these data.

It is thus the switched Ethernet (in full-duplex mode) associated with specific modifications making it possible to take into account the real-time and certification constraints of the aeronautical realm that has been selected for the new avionic networks. AFDX is standardized by part 7 of the ARINC (acronym for "Aeronautical Radio, Incorporated," trademark) standard 664, a standard that moreover provides for subsequent needs, such as confidentiality or compatibility with the IPv6 protocol.

The AFDX thus is based on open standards and fulfills the purposes of a modular communication system for avionics. It supplies means for sharing of resources, segregation of flows as well as the determinism and availability required for aeronautical certifications. Most of the specific AFDX functions are at the data link level.

In order to meet the need for availability of the network, an AFDX network is physically redundant: each terminal equipment item sends out the messages on two different channels to independent sets of switches both ensuring the same transmission. That makes it possible to reduce the number of transmission failures, and the problems linked to physical breakdowns. This redundancy also allows "dispatch" (departure) of the airplane when one, or even several, switch(es) is/are out of order.

The robust segregation of the data flows relies on pass-band reservation at a communication channel called VL (acronym for "virtual link" or virtual link). These channels are associated with a sender and the data are transmitted there over Ethernet in multicast mode (in English "multicast"). The switches allow segregation of the flows through a mechanism of access control lists (the English acronym for which is "ACL") filtering the traffic according to addresses (Ethernet or MAC, acronym for "Medium Access Control" for control of access to the medium), in a manner similar to the firewalls used in IP (acronym for "Internet Protocol").

In order to guarantee observance of the real-time data transmission constraints, the AFDX virtual links are associated with pass-band specifications (or "contracts"). These specifications establish the maximal size of the frames transmitted and the minimum time between two frames. These two parameters make it possible to evaluate the maximal pass band of a given virtual link. The contract therefore is taken on by the switches that manage these virtual links.

Determinism and transmission times are guaranteed by the pass-band contract associated with the switching which avoids collisions and retransmissions.

The virtual link concept allows calculation of the maximal transmission latencies, which makes it possible to achieve aeronautical certification of the system. In practice, the Ethernet network therefore necessarily is underused in order to allow the establishment of these guarantees.

Detection of non-alteration of data is performed via a cyclic redundancy check, or CRC (acronym for "Cyclic Redundancy Check"), which forms part of the AFDX (802.3) frame and which is specified by the standard 802.3.

The CRC mechanism is used in the following manner:
on each transmission of a frame by a subscriber, the "link" layer according to the OSI model, the MAC layer, of the communication interface is in charge of calculating the CRC which is sent in the frame;
at each AFDX switch, for each frame received, the integrity is verified via the CRC; if the frame is altered, the switch destroys it; otherwise the frame is switched to the addressee or addressees;
at each addressee, as for the switches, for any frame received, the integrity is verified via the CRC; if the frame is altered, the addressee destroys it; otherwise it is restored to the higher level functions.

The CRC is calculated before transmission and added to the frame. On reception, it is recalculated, and compared with the one received in order to verify their agreement. The calculation of the CRS is constructed so that errors of certain types, such as those due to interferences in transmissions, are detected with a very great probability.

On a network relying on 802.3 (Ethernet) frames, the guarantee that a message has not been altered thus is based on the use of the CRC which provides a certain probability of non-detection.

This CRC is generated by polynomial division, and relies on the theory of the codes (Cyclic Code with Generator Polynomial, Hamming distance, . . . ).

The quality of coverage by the CRC is based on the following assumptions:
the disruptive element (noise) follows a uniform probability law,
the noise is independent of the message,
the noise may be localized.

This CRC mechanism provides a certain confidence if these assumptions remain valid and, in particular, if all the elements of the network can alter the messages only randomly.

On the other hand, if it is assumed that equipment items, such as switches, have knowledge of the calculation mechanism of the CRC, that they are intelligent and that they may perform malevolently, it may be assumed that they are able to prepare valid frames, with correct CRC but with altered data. This assumption invalidates the purpose of using the sole CRC 802.3 for critical communications.

At the present time, any airplane function that seeks to guard against this type of problem (corrupt data item not detected), is obliged to use circumvention means consisting in sending the data item by two different paths, then comparison of the two data items received in order to validate the integrity. The two paths may rely on the same network but at no time must the two data items go through the same equipment. Another technique consists in sending one data item over the network and the other data item with another communication technology (ARINC 429, CAN, acronym for Car Area Network for local vehicle network).

Each of these techniques is costly and complex to implement.

This invention seeks to remedy these drawbacks.

To this end, according to a first aspect, this invention applies to a method for transmitting data over a network, from a sending application to a receiving application, characterized in that it comprises:

a step of coding the said data, by the said sending application, by implementing a predefined rule, a step of detecting alteration of at least one transmitted data item, by the said receiving application, by implementing the said predefined rule, and, in the event of detection of alteration of a data item, a step of restoring the altered data item.

In this way, each data item is protected from start to finish, the applications implementing the predefined coding and decoding rules, which makes them independent of the communication means used over the network. Another advantage of the implementation of this invention is that the choice of the coding may be adapted to the type of error envisaged and to the confidence level wished to be achieved.

This invention thus makes it possible to obtain an independence of verification of the alteration of a message over the network using the AFDX or 802.3 (Ethernet) technology. By relying on a simple coding, its implementation is made possible on airplane computers having limited operating features.

According to specific characteristics, during the step of coding, during the step of detecting alteration and during the step of restoring, a cyclic redundancy check is implemented.

Preferentially the code is based on a CRC as different as possible from the IEEE 802.3 CRC. It makes it possible to protect against a random alteration of the data and, because it is not known by the active equipment items of the network, or switches, invalidates the assumption of an alteration by these equipment items.

According to specific characteristics, during the step of coding and during the step of detecting alteration, an encryption is implemented.

According to specific characteristics, the said encryption is based on a MAC (acronym for "Message Authentication Codes") authentication code.

According to specific characteristics, the said encryption implements a cryptographic hash function.

By virtue of each of these provisions, there is a greater resistance to a "malevolence"-type corruption (shifting of the data, concatenation of two messages, XOR between two messages, etc.).

According to specific characteristics, the method comprises a step of linear K transforming.

According to specific characteristics, the step of linear K transforming implements an "or exclusive" function.

According to specific characteristics, the result of the linear K function is cut up into a plurality of blocks that are inverted individually.

According to specific characteristics, the method that is the object of this invention, such as briefly set forth above, implements an expansion box that processes the inverted blocks by a cyclic redundancy check.

According to a second aspect, this invention applies to a device for data transmission over a network, from a sending application to a receiving application, characterized in that it comprises:

a means for coding of the said data, by the said sending application, by implementing a predefined rule, a means for detecting alteration of at least one transmitted data item, by the said receiving application, by implementing the said predefined rule, and, a means for data restoring adapted for restoring an altered data item in the event of detection of alteration of the said data item.

Since the specific advantages, purposes and characteristics of this device are similar to those of the method, such as briefly set forth above, they are not repeated here.

Other specific advantages, purposes and characteristics of this invention will become apparent from the description that is going to follow, provided in an explanatory and in no way limitative intent, with reference to the attached drawings, in which.

Figure 1:
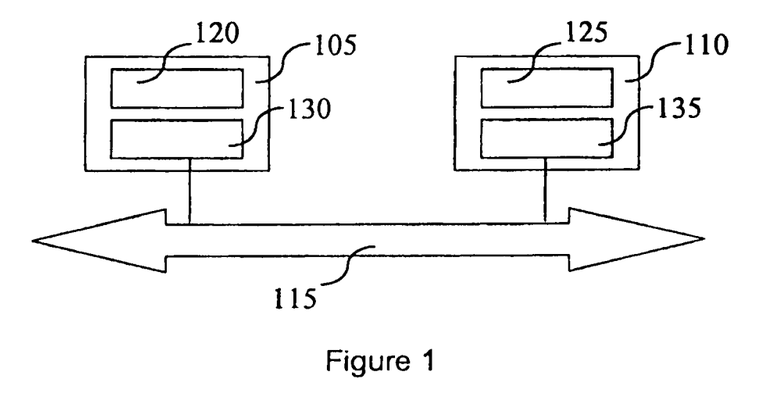
FIG. 1 schematically shows an implementation of an AFDX network for the transmission of applicative data, FIG. 2 schematically shows a data frame circulating over the network illustrated on FIG. 1, FIG. 3 schematically shows a transmission of known type over an AFDX network, FIG. 4 details an exemplary implementation of this invention using a network and a bus, FIG. 5 schematically shows an implementation of a coding at the applicative level, FIG. 6 schematically illustrates a data frame circulating over the network illustrated on FIG. 5, FIG. 7 schematically shows a specific embodiment of the method that is the object of this invention, FIG. 8 schematically illustrates a data frame circulating over the network illustrated on FIG. 7, FIG. 9 schematically shows another specific embodiment of the method that is the object of this invention, FIG. 10 schematically illustrates a data frame circulating over the network illustrated on FIG. 9 and FIGS. 11 and 12 show, in the form of logic diagrams, steps implemented in two implementation variants of the specific embodiment illustrated on FIG. 9.

On FIG. 1 there are seen two terminals 105 and 110 connected with one another by a network 115. Sending terminal 105 implements a sending application 120 and receiving terminal 110 implements a receiving application 125. Network 115 is of AFDX technology. In this example, sending application 120 sends an applicative data item to receiving application 125. To this end, sending application 120 transmits applicative data item 150 (see FIG. 2) to AFDX interface 130 of terminal 105.

Figure 2:
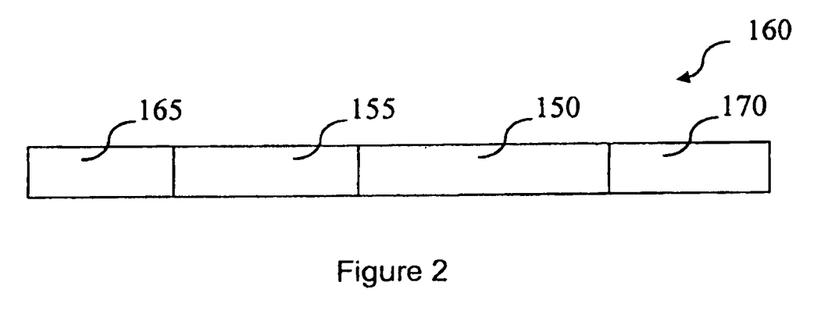

AFDX interface 130 is in charge of further adding a protocol header 155, called "UDP/IP" to this applicative data item 150 and encapsulating the result in a frame 160 in accordance with the standard 802.3. This frame 160 is made up of a header 165, data made up of UDP/IP header 155 and applicative data item 150 and a cyclic redundancy check CRC 170. Header 165 is used to identify the sender and the addressee of the message, while CRC 170 makes it possible to verify the integrity of the frame.

At the time of reception of frame 160 by terminal 110, its AFDX interface 135 verifies the integrity of frame 160 by implementing CRC 170. After acceptance of frame 160, interface 135 uses protocol header 155 to extract applicative data item 150 which is transmitted to receiving application 125.

Figure 3:
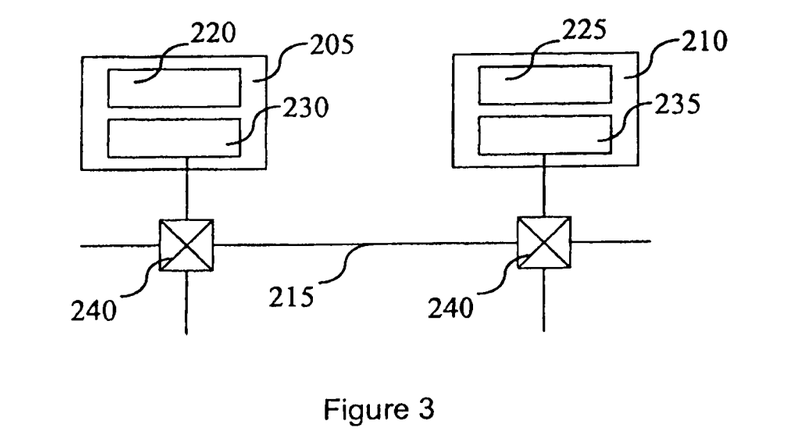

FIG. 3 presents a standard communication over an AFDX network, terminal 205 uses a virtual link (or "VL") 215, to send data to a terminal 210. Sending terminal 205 implements a sending application 220 and receiving terminal 210 implements a receiving application 225. The AFDX frames go through two AFDX interfaces 230 and 235 and two switches 240 by following virtual link 215. In this setup, switches 240 may alter AFDX frames, by modifying the data and the CRC in order to make error detection impossible. For example, if terminal 205 is a display screen, a speed-type information item may be false and lead to an error at the time of reading thereof.

In the remainder of the description, in particular FIGS. 4 to 10, for a purpose of clarity, only the networks have been shown and not the virtual paths and the switches which they comprise.

Figure 4:
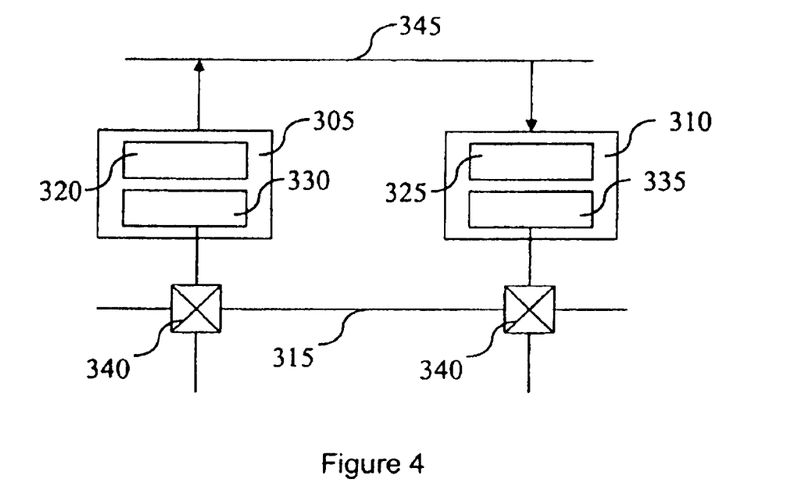

FIG. 4 details an implementation of this invention which makes it possible to detect corruption of the applicative data item, on reception of a frame. On FIG. 4 there are seen two terminals 305 and 310 connected with one another by a virtual link over an AFDX network 315. Sending terminal 305 implements a sending application 320 and an AFDX interface 330 and receiving terminal 310 implements a receiving application 325 and an AFDX interface 335.

In this embodiment, two types of technology are used: an AFDX network 315 and an "ARINC 429" bus 345. Terminal 305 sends the same message over the virtual link of AFDX network 315, and over "ARINC 429" bus 345. Receiving application 325 of terminal 310 receives the two messages and is able to compare them. If they are identical, receiving application 325 uses one of them, otherwise it destroys them.

Figure 5:
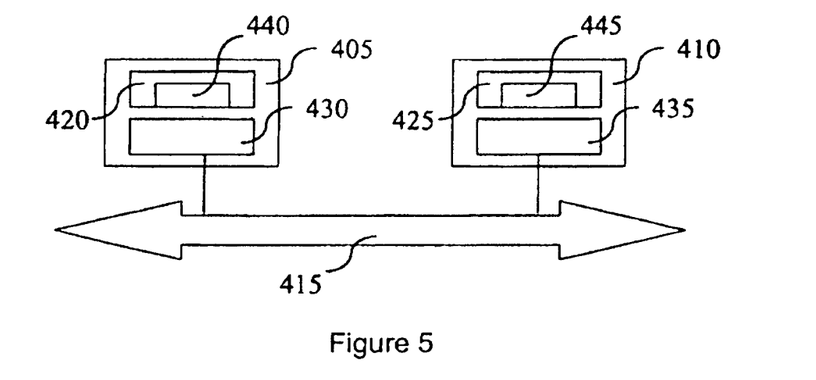

FIG. 5 shows a solution implementing a coding at the applicative level which is not known by AFDX network 415, that is to say by its switches. On FIG. 5 there are seen two terminals 405 and 410 connected with one another by a virtual link over an AFDX network 415. Sending terminal 405 implements a sending application 420 and an AFDX interface 430 and receiving terminal 410 implements a receiving application 425 and an AFDX interface 435. Sending application 420 of terminal 405 codes the message by implementing a coding function 440, then transmits a coded applicative data item 450 (see FIG. 6) to its AFDX interface 430. AFDX interface 430 further adds protocol header (UDP/IP) 455 to this data item 450 coded by coding function 440 and encapsulates the result in a frame 460 in accordance with the standard 802.3.

Figure 6:
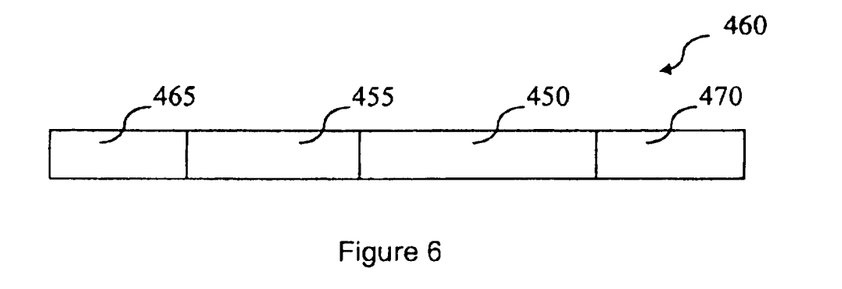
Figure 7:
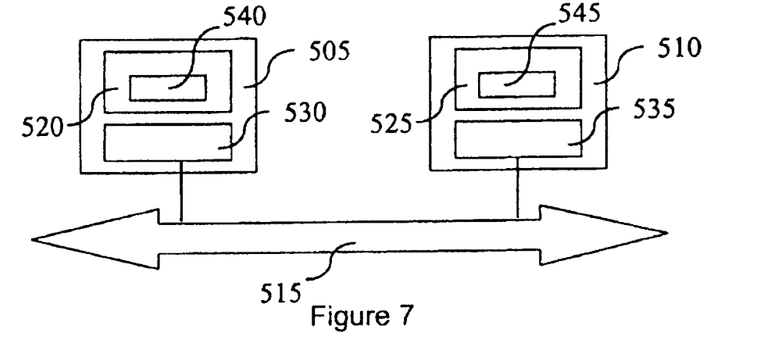

This frame 460 is made up of 802.3 header 465, protocol UDP/IP header 455, coded applicative data item 450 and CRC 470. 802.3 header 465 is used to identify the sender and the addressee of the message, while CRC 470 makes it possible to verify the integrity of the frame.

In reception, terminal 410 receives this frame and its AFDX interface 435 verifies the integrity of the frame via CRC 470. After acceptance of the frame as honest, AFDX interface 435 uses protocol header 455 to extract coded applicative data item 450, and to transmit it to receiving application 425. Receiving application 425 implements its decoding function 445 to recover applicative data item 450 prior to use thereof.

Two embodiments as well as the associated codings are described in the following. In a first embodiment, illustrated on FIG. 7, an applicative cyclic redundancy check is used. On FIG. 7 there are seen two terminals 505 and 510 connected with one another by a virtual link 515 over an AFDX network. Sending terminal 505 implements a sending application 520 and an AFDX interface 530 and receiving terminal 510 implements a receiving application 525 and an AFDX interface 535. A CRC 540 calculation function forms an integral part of sending application 520 and a CRC 545 calculation function forms an integral part of receiving application 520.

In transmission, the CRC 540 function calculates the value of CRC (32 bits) 575 (see FIG. 8), which is further added to applicative data item 550. This new data item then is transmitted to the communication stack that is in charge of sending it over network 515.

Figure 8:
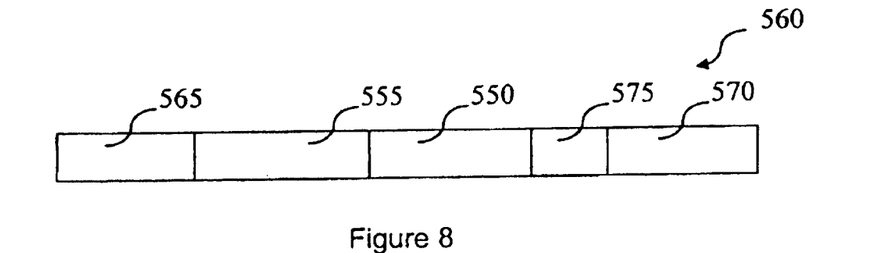

In reception, the CRC 545 function recalculates CRC 575 and compares it with the CRC received in frame 560. If they are identical, the data item is said to be "honest" and CRC 575 is removed so as to obtain applicative data item 550.

CRC 575 is, as much as possible, different from CRC 802.3 which is based on the following generator polynomial:
$x^{32}+x^{26}+x^{23}+x^{22}+x^{16}+x^{12}+x^{11}+x^{10}+x^8+x^7+x^5+x^4+x^2+x+1$ The choice of CRC 575 itself is based on a degree 32 polynomial, different from that of CRC 802.3 given above, but which guarantees a CRC code with Hamming distance of at least 6. The theory on corrective codes makes it possible to work out four CRC usable over the AFDX network and based on polynomials.

Thus, CRC 575 used has as specifications:
  to be statistically independent, with regard to CRC 802.3 and
  to have the greatest possible minimal distance on a data item (made up of n bits) of the form (data item, crc(data item)), where the length of the data item is ≤700 bytes and crc(data item) a function of 32-bit length.

Figure 9:
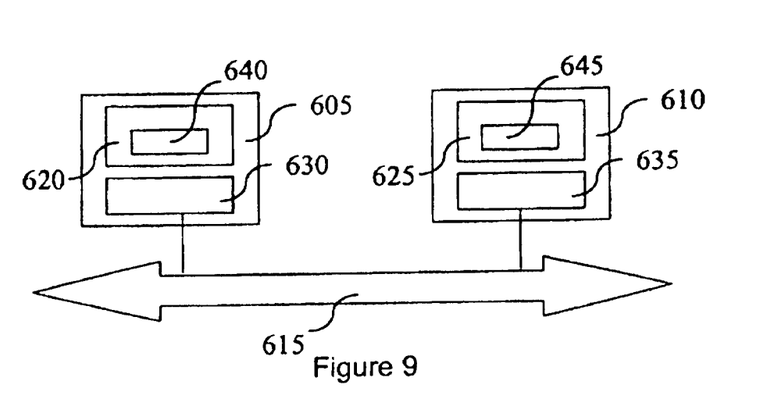

In the second embodiment, illustrated on FIG. 9. On FIG. 9 there are seen two terminals 605 and 610 connected with one another by a virtual link 615 on an AFDX network. Sending terminal 605 implements a sending application 620 and an AFDX interface 630 and receiving terminal 610 implements a receiving application 625 and an AFDX interface 635. A cryptographic function 640 forms an integral part of sending application 620 and a cryptographic function 645 forms an integral part of receiving application 620.

It is assumed that the switches of network 615 may perform as enemies. The integrity check at the applicative level must be independent, in the method sense, of the integrity check of the network. To this end, cryptographic techniques and, preferentially, message authentication codes (MAC) are implemented. In this way there is created an authentication block (the certificate) 675 (see FIG. 10) which is based on the applicative data item to be transmitted 650 and on a secret key. The certificate is determined according to the formula c=h(m), with m representing the message (here, applicative data item 650), and h an encryption function using a secret key.

On transmission, data item m is transformed into a message M that is made up of a concatenation of data item 650 and certificate c=h(m) 675. Network 615 is unable to calculate the function h(m) because it does not know the secret key. Frame 660 illustrated on FIG. 10 also comprises protocol header 655, header 665 in accordance with standard 802.3 and a cyclic redundancy check CRC 670.

Figure 10:
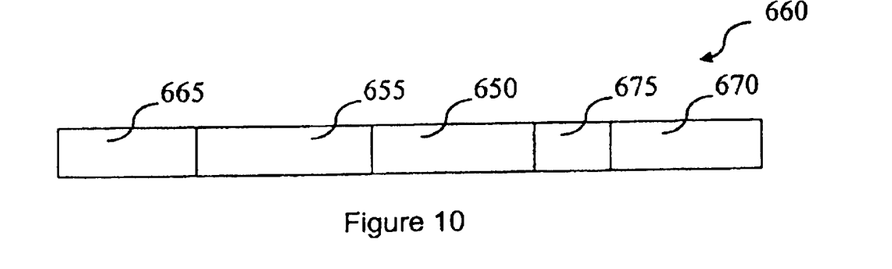

Receiving terminal 610 performs the same calculation on data item 650 and compares the MAC obtained in this way with the MAC received. In the event of difference, the message is rejected. Otherwise, applicative data item 650 is used by receiving application 625. As a variant, in reception of message M, a decryption function extracts applicative data item m 650, knowing the secret key used. In this way the integrity of the received message is verified.

Two embodiment variants are detailed below. In the first, one is working with a 32-bit certificate and, in the second, with a 64-bit certificate, which has as an advantage, in comparison with the first, that:
  the probability of success of an attack is divided by $2^{32}$,
  if a transformation table is used, its integrity may be verified,
  the certificate is protected by an additional protection (known under the name of expansion).

Figure 11:
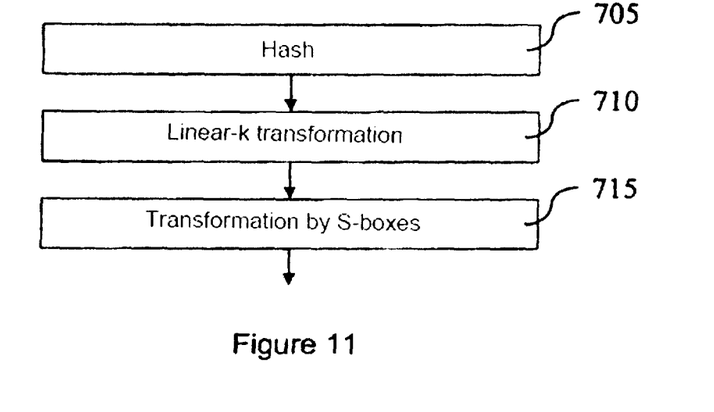

In the first embodiment variant, the h function is made up of several tasks illustrated on FIG. 11:
  the first task 705 uses a principle of hashing (in English "hash") the message in order to generate a 32-bit data item, called condensate. These 32 bits are obtained by implementing a generator polynomial that performs the hash;

in order to increase the dissymmetry of these 32 bits obtained in the hash, a task 710 of linear K transformation is used and is made up by an XOR. It is made up by a K1 key before the S-boxes;

then a task 715 of transformation based on a highly non-linear function is used in order to encrypt the result of task 710. Task 715 uses S-box concepts which, here, allow a modular inversion. The S-boxes work on an eight-bit hash giving four blocks that are inverted individually by an S-box. Non-linearity is obtained by a choice of a function based on a modular inversion the non-linearities of which are maximal. This function is, for example, the following:

$f$ combines with $a(x)$: $b(x)=((1/a(x))\cdot \mod t(x)$ with $t(x)=x^8+x^4+x^3+x+1$ The S-box representing this function may be implemented either by an algorithm, or by the use of a predefined table.

Figure 12:
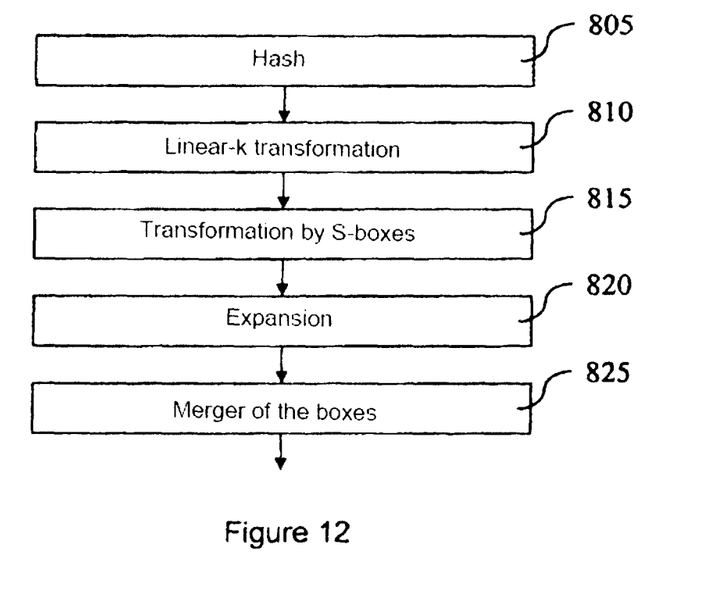

In the second embodiment variant, the h function is made up of several tasks illustrated on FIG. 12:

a first task 805 uses a principle of hashing the message in order to generate a 32-bit data item. The principle adopted is to obtain these 32 bits by a generator polynomial that performs the hash;

in order to increase the dissymmetry of these 32 bits obtained in the hash, a task 810 of linear K transformation is used and made up by an XOR;

this new value is cut up into four eight-bit blocks that are inverted individually by an S-box, based on a modular inversion the non-linearities of which are maximal. This function is the following:

$f$ combines with $a(x)$: $b(x)=((1/a(x))\cdot \mod t(x)$.

Starting from the obtaining of this new value, instead of using only S-boxes, as in the first embodiment variant, an expansion box 820 "EXP" follows S-boxes 815. This expansion is obtained by a cyclic redundancy check CRC the non-linearities of which are maximal. In this way a CRC on 32 bits is obtained, which is shortened to obtain a code of 16-bit length.

Preferentially, these two boxes are merged and in this way there is obtained a single box that may be implemented either by an algorithm, or by the use of a predefined table.

In each of the embodiments, when an alteration of the applicative data item is detected, restoration thereof is undertaken. According to the embodiments, this restoration may be accomplished by a retransmission of the altered data item, from the sending application to the receiving application, after request from the latter, that is, by use of the cyclic redundancy checks common to the sending and receiving applications, when they are provided in order to allow correction of transmission errors.

It is seen that the implementation of two paths, as illustrated on FIG. 3, may be combined with the implementation of this invention, for example to constitute a safety (in English "backup") copy.

The invention claimed is:

1. A method for transmitting data over an AFDX network, from a sender to a receiver, the sender includes a sending application and a sending network interface, the receiver includes a receiving application and a receiving network interface, the method comprising:

coding the data, by the sending application, by implementing a first predefined CRC rule, to produce a coded application data, the first predefined CRC rule includes performing a K-linear transforming function, splitting the result of the K-linear transforming function into a plurality of blocks, individually inverting the plurality of blocks using S-boxes, and performing an expansion by a CRC of maximal non-linearities in the encoded data;

further coding the coded application data, by the sending network interface, by implementing a second predefined CRC rule different than the first predefined CRC rule, to produce a coded network frame, a process to code data by the first predefined CRC rule being different than a process to code data by the second predefined CRC rule;

sending the coded network frame over the AFDX network from the sender to the receiver;

decoding the coded network frame, by the receiving network interface, by implementing the second predefined CRC rule;

detecting alteration of at least a portion of the data, by the receiving application, by implementing the first predefined CRC rule; and in event of detection of alteration of at least the portion of the data, restoring the altered data item by sending a request, from the receiving application to the sending application over the AFDX network, to retransmit the data.

2. A method according to claim 1, wherein during the coding, during the further coding, during the detecting alteration, and during the restoring, a cyclic redundancy check is implemented.

3. A method according to claim 1, wherein during the coding, during the further coding, and during the detecting alteration, an encryption is implemented.

4. A method according to claim 3, wherein the encryption is based on a MAC (Message Authentication Codes) authentication code.

5. A method according to claim 3, wherein the encryption implements a cryptographic hash function.

6. A method according to claim 5, wherein the encryption further comprises a K-linear transforming function.

7. A method according to claim 6, wherein the K-linear transforming function implements an "exclusive-or" function.

8. A method according to claim 6, wherein a result of the K-linear transforming function is cut up into a plurality of blocks that are inverted individually.

9. A method according to claim 8, further comprising processing the inverted blocks by a cyclic redundancy check.

10. A device for transmitting and receiving data over an AFDX network, the device comprising:

a sending application;

an encoder that encodes data from the sending application to produce a coded application data by implementing a first predefined CRC rule that includes performing a K-linear transforming function, splitting the result of the K-linear transforming function into a plurality of blocks, individually inverting the plurality of blocks using S-boxes, and performing an expansion by a CRC of maximal non-linearities in the encoded data;

a sending network interface that further encodes the coded application data by implementing a second predefined CRC rule different than the first predefined CRC rule to produce a transmitted coded network frame and transmits the transmitted coded network frame over the AFDX network;

a receiving network interface that decodes a received coded network frame by implementing the second predefined CRC rule to produce received coded application data, a process to code data by the first predefined CRC rule being different than a process to code data by the second predefined CRC rule;

a receiving application including an alteration detecting section that detects alteration of at least a portion of the data in the received coded application data by implementing the first predefined CRC rule; and a data restoring section that restores at least the portion of the data in event of detection of alteration of the data by sending a request, from the receiving application to the sending application over the AFDX network, to retransmit the data.

11. A method according to claim 1, further comprising:
selecting the first predefined rule to be statistically independent of the second predefined rule.

12. A method according to claim 1, further comprising:
selecting the first predefined CRC rule to have a greatest possible minimal distance on a data item in the coded application data having of the form (data item, crc(data item)), where a length of the data item is less than or equal to 700 bytes and crc(data item) is a function of 32-bit length.

13. A method according to claim 1, further comprising:
selecting the first predefined CRC rule to produce a data item in the coded application data including a certificate according to a formula $c=h(m)$, where m represents the data sent by the application and h is an encryption function using a secret key.

* * * * *